United States Patent [19]

Pape et al.

[11] Patent Number: 5,446,136
[45] Date of Patent: Aug. 29, 1995

[54] PYRAZOLE AZO DYESTUFFS

[75] Inventors: Kerstin Pape; Horst Berneth, both of Leverkusen, Germany

[73] Assignee: Bayer Aktiengesellschaft, Leverkusen, Germany

[21] Appl. No.: 355,365

[22] Filed: Dec. 13, 1994

[30] Foreign Application Priority Data

Dec. 20, 1993 [DE] Germany .................. 43 43 454.1

[51] Int. Cl.$^6$ ............... C09B 29/036; C09B 29/09; D06P 1/18; D06P 3/54
[52] U.S. Cl. ............... 534/753; 534/588; 534/607; 534/792; 534/793; 534/794; 534/775; 534/777; 534/591; 534/592; 8/471; 8/531; 8/692; 8/921; 8/922; 8/924
[58] Field of Search ........... 534/753, 792, 793, 794, 534/777, 775, 607

[56] References Cited

U.S. PATENT DOCUMENTS

| | | | |
|---|---|---|---|
| 3,336,285 | 8/1967 | Towne et al. | 534/792 X |
| 3,770,716 | 11/1973 | Ozutsumi et al. | 534/607 |
| 4,065,447 | 12/1977 | Jotterand | 534/792 |
| 5,079,213 | 1/1992 | Chapman et al. | 503/227 |
| 5,144,015 | 9/1992 | Chapman | 534/753 X |
| 5,208,325 | 5/1993 | Berneth et al. | 534/607 |

FOREIGN PATENT DOCUMENTS

| | | | |
|---|---|---|---|
| 2539653 | 4/1976 | Germany | 534/792 |
| 2727268 | 1/1979 | Germany | 537/792 |
| 231785 | 1/1986 | Germany | 548/377.1 |
| 1566985 | 5/1980 | United Kingdom | 534/792 |

*Primary Examiner*—Robert W. Ramsuer
*Assistant Examiner*—Fiona T. Powers
*Attorney, Agent, or Firm*—Sprung Horn Kramer & Woods

[57] ABSTRACT

Pyrazole azo dyestuffs of the formula (I)

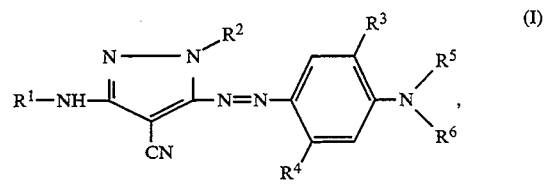

in which
$R^1$ denotes hydrogen or an acyl radical,
$R^2$ denotes hydrogen, alkyl, alkenyl, cycloalkyl, aralkyl, aryl or a heterocyclic radical which is optionally bonded via alkylene,
$R^3$ denotes hydrogen, halogen, alkyl or alkoxy,
$R^4$ denotes hydrogen, halogen, hydroxyl, amino, nitro, cyano, alkyl, alkoxy, acylamino, acyloxy or alkoxycarbonyl,
$R^5$ and $R^6$ independently of one another in each case denote hydrogen, alkyl, aralkyl or aryl or
$NR^5R^6$ together denotes a hydrogenated heterocyclic radical which is bonded via the nitrogen and optionally contains further hetero atoms, it being possible for all the alkyl, alkenyl, cycloalkyl, aralkyl, aryl, alkoxy and heterocyclic radicals present to be optionally substituted by nonionic substituents, a novel process for their preparation and their use for dyeing and printing materials.

6 Claims, No Drawings

PYRAZOLE AZO DYESTUFFS

Azo dyestuffs which contain 5-amino-4-cyanopyrazoles as diazo component are known (for example DE-OS (German Offenlegungsschrift 25 39 653, 27 27 268, U.S. Pat. No. 5 079 213, DDR 231 785). They are prepared in the customary manner by diazotization and coupling. In the 3-position, these dyestuffs carry, for example, hydrogen, halogen, alkyl, aryl, alkoxy, alkoxycarbonyl or alkylthio. Amino- or acylamino-substituted derivatives are not known.

The present invention relates to pyrazole azo dyestuffs of the formula (I)

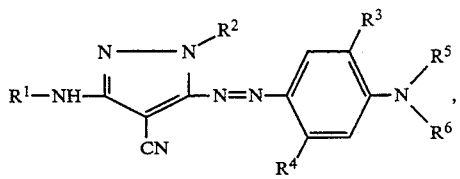

in which
$R^1$ denotes hydrogen or an acyl radical,
$R^2$ denotes hydrogen, alkyl, alkenyl, cycloalkyl, aralkyl, aryl or a heterocyclic radical which is optionally bonded via alkylene,
$R^3$ denotes hydrogen, halogen, alkyl or alkoxy,
$R^4$ denotes hydrogen, halogen, hydroxyl, amino, nitro, cyano, alkyl, alkoxy, acylamino, acyloxy or alkoxycarbonyl,
$R^5$ and $R^6$ independently of one another in each case denote hydrogen, alkyl, aralkyl or aryl or
$NR^5R^6$ together denotes a hydrogenated heterocyclic radical which is bonded via the nitrogen and optionally contains further heteroatoms,
it being possible for all the alkyl, alkenyl, cycloalkyl, aralkyl, aryl, alkoxy and heterocyclic radicals present to be optionally substituted by nonionic substituents,
a novel process for their preparation and their use for dyeing fibres, threads, flocks, woven fabrics and knitted fabrics and for printing woven fabrics and knitted fabrics of acetylcellulose (for example 2½- and triacetate), polyesters and polyamides, preferably polyesters.

Nonionic substituents can be, for example, non-dissociating substituents which are customary in dyestuff chemistry, such as cyano, hydroxyl, fluorine, chlorine, bromine, nitro, alkyl, alkoxy, phenyl, acyloxy, acylamino, alkoxycarbonyl and alkoxycarbonyloxy.

In the scope of the meaning of $R^1$ to $R^6$ and the nonionic substituents, the following radicals can have, for example, the particular meaning given:

Acyl radicals, including those in acyloxy and acylamino radicals, can be, for example, alkanoyl radicals, benzoyl radicals, alkanesulphonyl radicals, benzenesulphonyl radicals, alkoxycarbonyl radicals, mono- or dialkylaminocarbonyl radicals or arylaminocarbonyl radicals.

Alkyl radicals, including those in alkoxy, alkanoyl, alkanesulphonyl, alkoxycarbonyl and aralkyl radicals, can be, for example, straight-chain and branched radicals having 1 to 8, preferably 1 to 4, C atoms.

Alkenyl radicals can be, for example, those having 2 to 6, preferably 2 or 3, C atoms.

Cycloalkyl radicals can be, for example, those having 4 to 7, preferably 5 or 6, C atoms.

Halogen can be, for example, fluorine, chlorine or bromine.

Aryl radicals, including those in aralkyl radicals, can be, for example, phenyl radicals, which can optionally be substituted by 1 to 3 of the nonionic substituents described above.

Heterocyclic radicals can be, for example, thienyl, furyl and pyridyl and their partly or completely hydrogenated derivatives. They can optionally contain 1 to 3 of the nonionic substituents described above.

Preferred compounds of the formula (I) are those in which
$R^1$ denotes hydrogen, $C_1$- to $C_8$-alkanoyl, $C_1$- to $C_8$alkanesulphonyl, benzoyl, benzenesulphonyl, $C_1$- to $C_8$-alkoxycarbonyl, $C_1$- to $C_8$-alkylaminocarbonyl or phenylaminocarbonyl, it being possible for all these radicals, apart from hydrogen, to be optionally substituted by up to 3 identical or different substituents from the group consisting of cyano, fluorine, chlorine, hydroxyl and $C_1$- to $C_4$-alkoxy,
$R^2$ denotes hydrogen, $C_1$- to $C_8$-alkyl, $C_2$- to $C_4$-alkenyl, $C_4$- to $C_7$-cycloalkyl, benzyl, phenethyl, phenyl, furylmethyl, pyridylmethyl or pyridylethyl, it being possible for alkyl radicals to be optionally branched and/or substituted by up to 3 identical or different substituents from the group consisting of cyano, fluorine, chlorine, hydroxyl, $C_1$-to $C_4$-alkoxy and $C_1$- to $C_4$-alkoxycarbonyl and it being possible for benzyl, phenethyl, phenyl, furfurylmethyl, pyridylmethyl and pyridylethyl radicals to be optionally substituted by up to 3 identical or different radicals from the group consisting of cyano, chlorine, hydroxyl, $C_1$- to $C_4$-alkyl, $C_1$- to $C_4$-alkoxy, nitro and $C_1$- to $C_4$-alkoxycarbonyl,
$R^3$ denotes hydrogen, fluorine, chlorine, $C_1$- to $C_4$-alkyl or $C_1$- to $C_4$-alkoxy, it being possible for alkyl and alkoxy radicals to be optionally substituted by up to 3 identical or different substituents from the group consisting of fluorine, chlorine and methoxy,
$R^4$ denotes hydrogen, fluorine, chlorine hydroxyl, amino, nitro, cyano, $C_1$- to $C_4$-alkyl, $C_1$- to $C_4$--alkoxy, $C_1$- to $C_4$-alkanoylamino, $C_1$- to $C_4$-alkanoyloxy, $C_1$- to $C_4$-alkanesulphonylamino, $C_1$- to $C_4$-alkanesulphonyloxy, $C_1$- to $C_4$-alkoxycarbonylamino, $C_1$- to $C_4$-alkoxycarbonyloxy, $C_1$- to $C_4$-dialkylaminocarbonylamino, $C_1$- to $C_4$-dialkylaminoc arbonyloxy or $C_1$- to $C_4$-alkoxycarbonyl, it being possible for these radicals, apart from hydrogen, fluorine, chlorine, hydroxyl, amino, nitro and cyano, to be optionally substituted by up to 3 identical or different substituents from the group consisting of fluorine and chlorine and
$R^5$ and $R^6$ independently of one another in each case denote hydrogen, $C_1$- to $C_8$-alkyl, benzyl, phenethyl or phenyl, it being possible for alkyl radicals to be optionally branched and/or substituted by up to 3 identical or different substituents from the group consisting of cyano, fluorine, chlorine, hydroxyl, $C_1$- to $C_4$-alkoxy, $C_1$- to $C_4$-alkoxycarbonyl, $C_1$- to $C_4$-alkanoyloxy and $C_1$- to $C_4$-alkoxycarbonyloxy and it being possible for benzyl, phenethyl and phenyl radicals to be optionally substituted by up to 3 identical or different substituents from the group consisting of chlorine, $C_1$- to $C_4$-alkyl and $C_1$- to $C_4$-alkoxy, or the group
$NR^5R^6$ together denotes pyrrolidino, piperidino, morpholino, piperazino, N-$C_1$- to $C_4$-alkylpiperazino or trimethylpyrazolino.

Particularly preferred compounds of the formula (I) are those in which $R^1$ denotes hydrogen, $C_1$- to $C_4$-alkanoyl, $C_1$- to $C_4$-alkanesulphonyl, benzoyl, benzenesulphonyl, $C_1$- to $C_4$-alkoxycarbonyl, $C_1$- to $C_4$-alkylaminocarbonyl or phenylaminocarbonyl, it being possible for all these radicals, apart from hydrogen, to be optionally substituted by up to 3 identical or different substituents from the group consisting of cyano, fluorine, chlorine and methoxy, $R^2$ is hydrogen, $C_1$- to $C_4$-alkyl, allyl, cyclopentyl, cyclohexyl, benzyl, phenethyl or phenyl, it being possible for alkyl radicals to be optionally substituted by up to 3 identical or different substituents from the group consisting of cyano, fluorine, chlorine, hydroxyl, methoxy, ethoxy, methoxycarbonyl and ethoxycarbonyl and it being possible for benzyl, phenethyl and phenyl radicals to be optionally substituted by up to 3 identical or different substituents from the group consisting of cyano, chlorine, hydroxyl, methyl, ethyl, methoxy, ethoxy, nitro, methoxycarbonyl and ethoxycarbonyl, $R^3$ denotes hydrogen, fluorine, chlorine, methyl or ethyl it being possible for methyl and ethyl to be optionally substituted by up to 3 identical or different substituents from the group consisting of fluorine, chlorine and methoxy, $R^4$ denotes hydrogen, fluorine, chlorine, hydroxyl, amino, nitro, cyano, methyl, ethyl, methoxy, ethoxy, formylamino, acetylamino, propionylamino, acetoxy, propionyloxy, methanesulphonylamino, ethanesulphonylamino, methoxycarbonylamino, ethoxycarbonylamino, methoxycarbonyloxy, ethoxycarbonyloxy, methoxycarbonyl or ethoxycarbonyl, it being possible for these radicals, apart from hydrogen, fluorine, chlorine, hydroxyl, amino, nitro, formylamino and cyano, to be optionally substituted by up to 3 identical or different substituents from the group consisting of fluorine and chlorine, $R^5$ and $R^6$ independently of one another in each case denote hydrogen, $C_1$- to $C_4$-alkyl, benzyl, phenethyl or phenyl, it being possible for alkyl radicals to be optionally substituted by up to 3 identical or different substituents from the group consisting of cyano, fluorine, chlorine, hydroxyl, methoxy, ethoxy, methoxycarbonyl, ethoxycarbonyl, acetoxy and propionyloxy and it being possible for benzyl, phenethyl and phenyl radicals to be optionally substituted by up to 3 identical or different substituents from the group consisting of chlorine, methyl and methoxy, or the group $NR^5R^6$ together denotes pyrrolidino, piperidino, morpholino, piperazino, N-methylpiperazino or trimethylpyrazolino.

Especially preferred compounds of the formula (I) are those in which $R^1$ denotes hydrogen, acetyl, propionyl, methanesulphonyl, ethanesulphonyl, methoxycarbonyl, ethoxycarbonyl or methylaminocarbonyl, $R^2$ denotes methyl, ethyl, propyl, butyl, cyanoethyl, chloroethyl, hydroxyethyl, hydroxypropyl, methoxyethyl, ethoxyethyl, methoxycarbonylethyl, allyl, cyclohexyl, benzyl, phenethyl, phenyl, tolyl or chlorophenyl, $R^3$ denotes hydrogen, chlorine or methyl, $R^4$ denotes hydrogen, fluorine, chlorine, hydroxyl, amino, methyl, ethyl, trifluoromethyl, formylamino, acetylamino, trifluoroacetylamino, propionylamino, acetoxy, methanesulphonylamino, methoxycarbonylamino, ethoxycarbonylamino, methoxycarbonyl or ethoxycarbonyl and $R^5$ and $R^6$ independently of one another in each case denote methyl, ethyl, propyl, butyl, chloroethyl, hydroxyethyl, cyanoethyl, methoxyethyl, methoxycarbonylethyl, acetoxyethyl, propionyloxyethyl, methoxycarbonyloxyethyl, ethoxycarbonyloxyethyl, benzyl, phenyl, tolyl or chlorophenyl.

Compounds of the formula (I) which are to be singled out in particular are those in which $R^1$ denotes hydrogen, formyl, acetyl, trifluoroacetyl, propionyl, methanesulphonyl, ethanesulphonyl, methoxycarbonyl or ethoxycarbonyl, $R^2$ denotes methyl, ethyl, propyl, cyanoethyl or benzyl, $R^3$ denotes hydrogen or methyl, $R^4$ denotes acetamino, propionylamino, methanesulphonylamino or methoxycarbonylamino and $R^5$ and $R^6$ independently of one another in each case denote methyl, ethyl, propyl, cyanoethyl, methoxyethyl, methoxycarbonylethyl or acetoxyethyl.

The present invention also relates to a process for the preparation of pyrazole azo dyestuffs of the formula (I) in which $R^1$ denotes hydrogen, which is characterized in that a cationic 1,3,4-thiadiazole dyestuff of the formula (II)

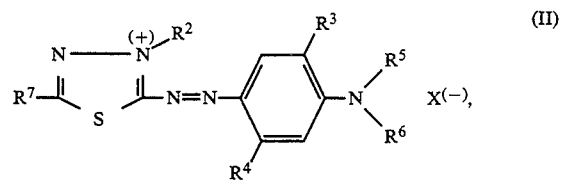

in which $R^2$, $R^3$, $R^4$, $R^5$ and $R^6$ have the meaning given in the case of formula (I)

$R^7$ denotes hydrogen, alkyl, cycloalkyl, aralkyl, aryl, a heterocyclic radical which is optionally bonded via alkylene, $OR^8$, $SR^8$ or $NR^8R^9$, $R^8$ and $R^9$ independently of one another denote hydrogen, alkyl, alkenyl, acyl, cycloalkyl, aralkyl, aryl or a heterocyclic radical which is optionally bonded via alkylene or $NR^8R^9$ denotes a completely hydrogenated heterocyclic radical which is bonded via the nitrogen and optionally contains further heteroatoms and $X^-$ denotes an anion, is reacted with malonitrile.

$X^-$ can be an organic or inorganic anion, for example chloride, bromide, methylsulphate, ethylsulphate, methanesulphonate, benzenesulphonate, acetate or sulphate. In the case of polyvalent anions, such as, for example, sulphate, $X^-$ in formula (II) represents one equivalent of such a polyvalent anion.

The present invention also relates to a process for the preparation of pyrazole azo dyestuffs of the formula (I) in which $R^1$ denotes an acyl radical, which is characterized in that pyrazole azo dyestuffs of the formula (I) in which $R^1$ denotes hydrogen are reacted with an acylating agent.

The cationic 1,3,4-thiadiazole dyestuffs of the formula (II) required as starting substances are known, for example, from FR 1 199 411, DE-OS (German Offenlegungsschrift 2 811 258 and EP-OS 0 495 250 or can be prepared analogously thereto.

The reaction of the dyestuffs of the formula (II) with malonitrile to give the pyrazole azo dyestuffs according to the invention where $R^1$=hydrogen can be carried out, for example, in the presence of a solvent and in the presence of a base at temperatures between 0° C. and the boiling point of the medium.

Preferred reaction temperatures are those between 15° and 40° C. As a rule, the reaction has ended after a short time, for example not more than 5 hours.

Possible solvents are, for example, alcohols, such as methanol, ethanol or isopropanol, ketones, such as acetone or butanone, esters, such as ethyl or butyl acetate, chlorinated hydrocarbons, such as chloroform or 1,2-dichloroethane, aromatic hydrocarbons, such as toluene or xylene, chlorinated aromatic hydrocarbons, such as chlorobenzene, and dipolar aprotic solvents, such as dimethylformamide, dimethyl sulphoxide, N-methylpyrrolidone, butyrolactone or acetonitrile, or mixtures thereof.

Possible bases are, for example, alkali metal or alkaline earth metal oxides and alkali metal or alkaline earth metal hydroxides, such as sodium hydroxide, potassium hydroxide and calcium oxide, and also alkali metal or alkaline earth metal carbonates, such as sodium, potassium or calcium carbonate, as well as alkali metal or alkaline earth metal alcoholates, such as sodium methylate or potassium tert-butylate, and amines, such as triethylamine, triethanolamine, pyridine, 4-dimethylaminopyridine, azabicyclononene and azabicycloundecene.

The use of alcohols as the solvent and of alkali metal or alkaline earth metal alcoholates as the base is preferred. Methanol and sodium methylate are particularly preferred.

As a rule, especially if alcohols are used as the solvent, the pyrazole azo dyestuffs of the formula (I) where $R^1$=hydrogen precipitate out of the reaction medium and can be isolated, for example, by filtration. Any by-products also precipitated can be removed, for example, by recrystallization or the use of chromatographic methods.

The reaction of pyrazole azo dyestuffs of the formula (I) where $R^1$=hydrogen to give pyrazole azo dyestuffs of the formula (I) where $R^1$=acyl can be carried out, for example, with an acylating agent in the presence of a solvent and possibly in the presence of a base at temperatures between room temperature and the boiling point of the medium. The preferred reaction temperature is in the range from 30° to 80° C. The reaction as a rule has ended after not more than 8 hours.

Possible solvents for this reaction are, for example, the carboxylic acid on which the acylating agent is based, such as formic acid, acetic acid or propionic acid, or the abovementioned ketones, esters, chlorinated hydrocarbons, aromatic hydrocarbons, chlorinated aromatic hydrocarbons and the polar aprotic solvents. Formic acid is expediently used as the solvent only if formylation is intended.

Possible acylating agents are, for example, carboxylic acids, such as formic acid, carboxylic acid anhydrides, such as acetic anhydride, propionic anhydride, trifluoroacetic anhydride or benzanhydride, carboxylic acid halides, such as acetyl chloride, propionyl chloride, benzoyl chloride, methylchloroformate and ethylchloroformate, sulphonic acid halides, such as methanesulphonyl chloride, nonafluorobutanesulphonyl chloride or 4-methylbenzenesulphonyl chloride, and isocyanates, such as methyl isocyanate, ethyl isocyanate, butyl isocyanate or phenyl isocyanate.

The use of bases is in general advantageous if acid halides are to be used as acylating agents. Possible bases are, for example, alkali metal and alkaline earth metal carbonates, alkali metal and alkaline earth metal hydrogen carbonate, such as sodium carbonate, sodium hydrogen carbonate, potassium carbonate and calcium carbonate, amines such as triethylamine, triisopropylamine and pyridine, and diazabicyclononene and diazabicycloundecene.

Preferred solvents are carboxylic acids and chlorinated aromatic hydrocarbons.

Preferred acylating agents are carboxylic acid anhydrides and chloroformic acid esters.

Preferred bases are sodium carbonate and triisopropylamine.

The dyestuffs of the formula (I) which contain acyl groups and are prepared in this manner either precipitate out of the reaction medium, or, when the reaction has ended, the reaction mixture is discharged onto water and the dyestuffs which then precipitate out are isolated, or the solvent is distilled off.

The pyrazole azo dyestuffs of the formula (I) according to the invention are outstandingly suitable, especially in finely divided form, for dyeing fibres, threads, flocks, woven fabrics and knitted fabrics and for printing woven fabrics and knitted fabrics of acetylcellulose (for example 2½- and triacetate), polyesters and polyamides, preferably polyesters.

The resulting dyeings are distinguished by good fastnesses and good affinity. The excellent fastnesses to wet processing, light and heat in many cases are to be singled out in particular.

The pyrazole azo dyestuffs of the formula (I) according to the invention, in particular those in which the radicals $R^1$ to $R^6$ contain not more than 3, preferably not more than 2, C atoms are also suitable for use in dyestuff diffusion and dyestuff sublimation transfer printing processes. In these, a dyestuff which diffuses or sublimes readily is first incorporated into a layer which is on a thin carrier material, for example of polyester. When this colour-donating layer is brought into contact with a receiving layer, which is likewise on a carrier material, the dyestuff is transferred from the colour-donating layer to the receiving layer by a thermal print heat controlled by electrical signals, and forms a pattern corresponding to the electrical signals on the receiving layer. Such a working technique is described, for example, in EP-OS (European Published Specification) 03 84 040.

EXAMPLES

Example 1

5.36 g of the dyestuff of the formula (II) where $R^2$=methyl, $R^3$=hydrogen, $R^4$=acetamino, $R^5=R^6$=ethyl, $R^7=R^8$=isopropyl and $X^-$=½ $ZnCl_4^{--}$ were dissolved in 40 ml of methanol. 0.72 g of malonodinitrile and 5.2 ml of 30% strength methanolic sodium methylate solution were added at room temperature. The mixture was stirred at room temperature for 2 hours and the precipitate was filtered off with suction and washed with methanol and water. After drying in vacuo, 2.05 g of the dyestuff of the formula (I) where $R^1$=hydrogen and $R^2$ to $R^6$ have the meaning given above were obtained.

Melting point: 225°–227° C. $\nu_{CN}$=2211 cm$^{-1}$
$\lambda_{max}$ (DMF)=526.5 nm The dyestuff dyed polyester in a bright, light-fast, slightly bluish-tinged red.

Example 2

1.77 g of the dyestuff from Example 1 were partly dissolved in 30 ml of glacial acetic acid at 50° C. 0.76 g of acetic anhydride was added and the mixture was stirred at this temperature for 4 hours and then cooled. The dyestuff was filtered off with suction, washed with a little glacial acetic acid and dried in vacuo. 1.65 g of the dyestuff of the formula (I) where $R^1$=acetyl and $R^2$ to $R^6$ have the meaning given in Example 1 were obtained.

Melting point: 238°–240° C.
$\lambda_{max}$ (DMF)=530.5 nm
The dyestuff dyed polyester in a bright, light-fast red.

Example 3

5.04 g of the dyestuff of the formula (II) where $R^2$=methyl, $R^3$=$R^7$=hydrogen, $R^4$=acetamino, $R^5$=$R^6$=ethyl and $X^-$=$ZnCl_3^-$ were reacted as described in Example 1. 1.6 g of the dyestuff also obtained according to Example 1 were obtained.

Examples 4 to 37

The following dyestuffs of the formula (I) were prepared analogously to Examples 1 and 2:

| Example No. | R¹ | R² | R³ | R⁴ | R⁵ | R⁶ | $\lambda_{max}$ or colour shade | analogously to Example |
|---|---|---|---|---|---|---|---|---|
| 4 | H | CH₃ | H | CH₃ | CH₂CH₂CN | CH₂CH₂CN | 483 | 1 |
| 5 | H | CH₃ | H | CF₃ | CH₃ | CH₃ | 494 | 1 |
| 6 | H | CH₃ | H | COOCH₃ | CH₃ | CH₃ | 498 | 1 |
| 7 | H | CH₃ | H | NHCOC₂H₅ | C₂H₅ | C₂H₅ | 521 | 1 |
| 8 | H | —CH₂—  | H | CH₃ | CH₂CH₂CN | CH₂CH₂CN | 491 | 1 |
| 9 | H | CH₂—CHCH₃ with OH | H | CH₃ | —CH₂— 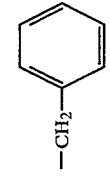 | C₂H₅ | bluish-tinged red | 1 |
| 10 | H | CH₃ | H | CH₃ | —(CH₂)₃— | | orange | 1 |
| 11 | H | CH₃ | OCH₃ | NHCOCH₃ | H |  | bluish-tinged red | 1 |
| 12 | CHO | CH₃ | H | NHCOCH₃ | CH₃ | CH₃ | red | 2 |
| 13 | COOC₂H₅ | C₂H₅ | H | NHCHO | C₂H₅ | CH₂CH₂Cl | red | 2 |
| 14 | H | CH₃ | H | NHCOC₂H₅ | CH₂CH₂OCOCH₃ | CH₂CH₂OCOCH₃ | red | 1 |
| 15 | COCH₃ | CH₃ | H | NHCOCH₃ | CH₂CH₂OCOCH₃ | CH₂CH₂OCOCH₃ | red | 2 |
| 16 | H | CH₂CH₂CN | H | NHSO₂CH₃ | C₃H₇ | C₃H₇ | red | 1 |
| 17 | COOCH₃ | CH₃ | H | NHSO₂CH₃ | C₃H₇ | C₃H₇ | 518 | 2 |
| 18 | H | CH₃ | H | NHCOCH₃ | CH₂CH₂OCH₃ | CH₂CH₂OCH₃ | 521 | 1 |
| 19 | CONHCH₃ | CH₂CH₂Cl | H | NHCOCH₃ | CH₂CH₂CN | CH₂CH₂CN | red | 2 |
| 20 | H | C₂H₅ | CH₃ | CH₃ | CH₂CH₂OCOCH₃ | CH₂CH₂OCOCH₃ | orange | 1 |
| 21 | SO₂CH₃ | C₂H₅ | CH₃ | CH₃ | CH₂CH₂OCOCH₃ | CH₂CH₂OCOCH₃ | orange | 2 |
| 22 | H | C₆H₅ | H | NHCOOC₂H₅ | CH₃ | 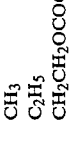 | bluish-tinged red | 1 |
| 23 | H | CH₃ | H | NHSO₂CF₃ | CH₃ | 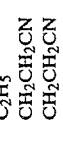 | bluish-tinged red | 1 |

-continued

| Example No. | $R^1$ | $R^2$ | $R^3$ | $R^4$ | $R^5$ | $R^6$ | $\lambda_{max}$ or colour shade | analogously to Example |
|---|---|---|---|---|---|---|---|---|
| 24 | ![phenyl-SO2]  | CH$_3$ | H | CN | CH$_2$CH$_2$OCOCH$_3$ | CH$_2$CH$_2$Cl | red | 2 |
| 25 | H | CH$_2$CH=CH$_2$ | H | OCOCH$_3$ | C$_2$H$_5$ | C$_2$H$_5$ | red | 1 |
| 26 | H | CH$_3$ | H | NHCONHC$_2$H$_5$ | CH$_2$CH$_2$CN | CH$_2$CH$_2$COOCH$_3$ | red | 1 |
| 27 | COCF$_3$ | CH$_3$ | H | NHCOCH$_3$ | CH$_2$CH$_2$OCH$_3$ | CH$_2$CH$_2$OCH$_3$ | red | 2 |
| 28 | H | CH$_3$ | H | NH$_2$ | C$_2$H$_5$ | C$_2$H$_5$ | 515 | 1 |
| 29 | COCH$_3$ | —CH$_2$—(phenyl) | H | Cl | CH$_2$CH$_2$OCOC$_2$H$_5$ | CH$_2$CH$_2$OCOC$_2$H$_5$ | red | 2 |
| 30 | H | —CH$_2$—(tetrahydrofuran-2-yl) | CH$_3$ | OCH$_3$ | —CH$_2$—(phenyl) | CH$_3$ | orange | 1 |
| 31 | H | CH(CH$_3$)$_2$ | H | —NHCO—(phenyl) | —CH$_2$CH$_2$—O—CH$_2$CH$_2$— | | red | 1 |
| 32 | SO$_2$C$_2$H$_5$ | CH$_3$ | H | NHCOCH$_3$ | C$_2$H$_5$ | CH$_2$CH$_2$CN | red | 2 |
| 33 | H | CH$_3$ | H | OCOOCH$_3$ | CH$_3$ | CH$_2$—(pyridin-2-yl) | red | 1 |
| 34 | COOCH$_3$ | CH$_2$CH$_2$Cl | CH$_3$ | CN | CH$_3$ | CH$_3$ | orange | 2 |
| 35 | H | CH$_3$ | H | COOC$_2$H$_5$ | CH$_2$CH$_2$OC$_2$H$_5$ | C$_2$H$_5$ | red | 1 |
| 36 | H | CH$_3$ | H | NHCOCH$_3$ | —(4-OC$_2$H$_5$-phenyl) | CH$_3$ | red | 1 |
| 37 | H | —CH$_2$—(phenyl) | H | OH | C$_2$H$_5$ | C$_2$H$_5$ | red | 1 |

Example 38

Dyeing Of Polyester 0.4 g of the dyestuff prepared according to Example 1 was stirred in finely dispersed form into 2000 ml of water. 4 g of a commercially available dispersing agent based on a naphthalenesulphonic acid-formaldehyde condensate and 2 g of sodium dihydrogen phosphate were added and a pH of 4.5 was established with acetic acid. 100 g of a polyester woven fabric based on polyethylene glycol terephthalate were introduced into the dispersion thus obtained. Dyeing was then carried out at 130° C. for 45 minutes and the fabric was rinsed, subjected to reductive after-treatment with a 0.2% strength by weight sodium dithionite solution at 70°–80° C. for 15 minutes, rinsed again and dried. The polyester woven fabric was dyed a luminous, slightly bluish-tinged red and had good colouristic fastness properties.

Similar dyeings in orange to bluish-tinged red shades were obtained in dyeing operations with the dyestuffs prepared according to Examples 2 to 37.

Example 39

Diffusion Transfer Printing

The colour donor element was prepared as follows:

A 0.5% strength by weight solution of the dyestuff prepared according to Example 5 and a 0.5% strength by weight solution of a binder based on a styrene/acrylonitrile copolymer in tetrahydrofuran were applied in a layer thickness of 100 μm in the moist state to a 5 μm thin polyethylene terephthalate film which had first been provided with a layer of a vinylidene chloride/acrylonitrile copolymer (2.5 μm thickness in the dry state). The layer formed was dried in vacuo. The reverse of the polyethyleneterephthalate film was coated with a solution which contains 5% by weight of a styrene/acrylonitrile copolymer and 0.1% by weight of a 1% strength by weight solution of a polysiloxane/-polyether copolymer (Tegoglide® 410 from Th. Goldschmidt). This solution was applied in a thickness of 100 μm and served to prevent the colour donor element from sticking to the thermal print head. The dyestuff donor element thus obtained was used in a Hitachi colour printer VY-100 A for printing onto commercially obtainable recording material (Hitachi VY-S 100 A paper ink set).

An intensive orange recording was obtained.

Analogous printing results with orange to bluish-tinged red recordings were obtained when the corresponding colour donor elements which contained the dyestuffs prepared according to the Examples 1 to 4 and 6 to 37 were used.

What is claimed is:

1. A pyrazole azo dyestuff of the formula (I)

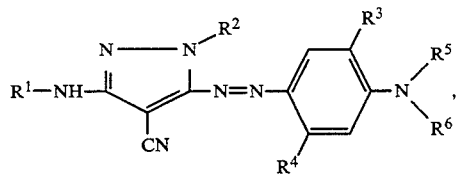

in which $R^1$ denotes hydrogen or an acyl radical, $R^2$ denotes hydrogen, alkyl, alkenyl, cycloalkyl, aralkyl, aryl or a heterocyclic radical which is optionally bonded via alkylene, $R^3$ denotes hydrogen, halogen, alkyl or alkoxy, $R^4$ denotes hydrogen, halogen, hydroxyl, amino, nitro, cyano, alkyl, alkoxy, acylamino, acyloxy or alkoxycarbonyl, $R^5$ and $R^6$ independently of one another in each case denote hydrogen, alkyl, aralkyl or aryl or $NR^5 R^6$ together denotes a hydrogenated heterocyclic radical which is bonded via the nitrogen and optionally contains further hetero atoms.

2. A pyrazole azo dyestuff of claim 1, in which in formula (I), $R^1$ denotes hydrogen, $C_1$- to $C_8$-alkanoyl, $C_1$- to $C_8$-alkanesulphonyl, benzoyl, benzenesulphonyl, $C_1$- to $C_8$-alkoxycarbonyl, $C_1$- to $C_8$-alkylaminocarbonyl or phenylaminocarbonyl, it being possible for all these radicals, apart from hydrogen, to be optionally substituted by up to 3 identical or different substituents from the group consisting of cyano, fluorine, chlorine, hydroxyl and $C_1$- to $C_4$-alkoxy, $R^2$ denotes hydrogen, $C_1$- to $C_8$-alkyl, $C_2$- to $C_4$-alkenyl, $C_4$- to $C_7$-cycloalkyl, benzyl, phenethyl, phenyl, furylmethyl, pyridylmethyl or pyridylethyl, it being possible for alkyl radicals to be optionally branched and/or substituted by up to 3 identical or different substituents from the group consisting of cyano, fluorine, chlorine, hydroxyl, $C_1$- to $C_4$-alkoxy and $C_1$- to $C_4$-alkoxycarbonyl and it being possible for benzyl, phenethyl, phenyl, furfurylmethyl, pyridylmethyl and pyridylethyl radicals to be optionally substituted by up to 3 identical or different radicals from the group consisting of cyano, chlorine, hydroxyl, $C_1$- to $C_4$-alkyl, $C_1$- to $C_4$-alkoxy, nitro and $C_1$- to $C_4$-alkoxycarbonyl, $R^3$ denotes hydrogen, fluorine, chlorine, $C_1$- to $C_4$-alkyl or $C_1$- to $C_4$-alkoxy, it being possible for alkyl and alkoxy radicals to be optionally substituted by up to 3 identical or different substituents from the group consisting of fluorine, chlorine and methoxy, $R^4$ denotes hydrogen, fluorine, chlorine, hydroxyl, amino, nitro, cyano, $C_1$- to $C_4$-alkyl, $C_1$- to $C_4$-alkoxy, $C_1$- to $C_4$-alkanoylamino, $C_1$- to $C_4$-alkanoyloxy, $C_1$- to $C_4$-alkanesulphonylamino, $C_1$- to $C_4$-alkanesulphonyloxy, $C_1$- to $C_4$-alkoxycarbonylamino, $C_1$- to $C_4$-alkoxycarbonyloxy, $C_1$- to $C_4$-dialkylaminocarbonylamino, $C_1$- to $C_4$-dialkylaminocarbonyloxy or $C_1$- to $C_4$-alkoxycarbonyl, it being possible for these radicals, apart from hydrogen, fluorine, hydroxyl, amino, nitro and cyano, to be optionally substituted by up to 3 identical or different substituents from the group consisting of fluorine and chlorine and $R^5$ and $R^6$ independently of one another in each case denote hydrogen, $C_1$- to $C_8$-alkyl, benzyl, phenethyl or phenyl, it being possible for alkyl radicals to be optionally branched and/or substituted by up to 3 identical or different substituents from the group consisting of cyano, fluorine, chlorine, hydroxyl, $C_1$- to $C_4$-alkoxy, $C_1$- to $C_4$-alkoxycarbonyl, $C_1$- to $C_4$-alkanoyloxy and $C_1$- to $C_4$-alkoxycarbonyloxy and it being possible for benzyl, phenethyl and phenyl radicals to be optionally substituted by up to 3 identical or different substituents from the group consisting of chlorine, $C_1$- to $C_4$-alkyl and $C_1$- to $C_4$-alkoxy, or the group NR$^5$R$^6$ together denotes pyrrolidino, piperidino, morpholino, piperazino, N-C$_1$- to C$_4$-alkylpiperazino or trimethylpyrazolino.

3. A pyrazole azo dyestuff of claim 1, in which in formula (I),

R$^1$ denotes hydrogen, C$_1$- to C$_4$-alkanoyl, C$_1$- to C$_4$-alkanesulphonyl, benzoyl, benzenesulphonyl, C$_1$- to C$_4$-alkoxycarbonyl, C$_1$- to C$_4$-alkylaminocarbonyl or phenylaminocarbonyl, it being possible for all these radicals, apart from hydrogen, to be optionally substituted by up to 3 identical or different substituents from the group consisting of cyano, fluorine, chlorine and methoxy, R$^2$ is hydrogen, C$_1$- to C$_4$-alkyl, allyl, cyclopentyl, cyclohexyl, benzyl, phenethyl or phenyl, it being possible for alkyl radicals to be optionally substituted by up to 3 identical or different substituents from the group consisting of cyano, fluorine, chlorine, hydroxyl, methoxy, ethoxy, methoxycarbonyl and ethoxycarbonyl and it being possible for benzyl, phenethyl and phenyl radicals to be optionally substituted by up to 3 identical or different substituents from the group consisting of cyano, chlorine, hydroxyl, methyl, ethyl, methoxy, ethoxy, nitro, methoxycarbonyl and ethoxycarbonyl, R$^3$ denotes hydrogen, fluorine, chlorine, methyl or ethyl it being possible for methyl and ethyl to be optionally substituted by up to 3 identical or different substituents from the group consisting of fluorine, chlorine and methoxy, R$^4$ denotes hydrogen, fluorine, chlorine, hydroxyl, amino, nitro, cyano, methyl, ethyl, methoxy, ethoxy, formylamino, acetylamino, propionylamino, acetoxy, propionyloxy, methanesulphonylamino, ethanesulphonylamino, methoxycarbonylamino, ethoxycarbonylamino, methoxycarbonyloxy, ethoxycarbonyloxy, methoxycarbonyl or ethoxycarbonyl, it being possible for these radicals, apart from hydrogen, fluorine, chlorine, hydroxyl, amino, nitro, formylamino and cyano, to be optionally substituted by up to 3 identical or different substituents from the group consisting of fluroine and chlorine, R$^5$ and R$^6$ independently of one another in each case denote hydrogen, C$_1$- to C$_4$-alkyl, benzyl, phenethyl or phenyl, it being possible for alkyl radicals to be optionally substituted by up to 3 identical or different substituents from the group consisting of cyano, fluorine, chlorine, hydroxyl, methoxy, ethoxy, methoxycarbonyl, ethoxycarbonyl, acetoxy and propionyloxy and it being possible for benzyl, phenethyl and phenyl radicals to be optionally substituted by up to 3 identical or different substituents from the group consisting of chlorine, methyl and methoxy, or the group NR$^5$R$^6$ together denotes pyrrolidino, piperidino, morpholino, piperazino, N-methylpiperazino or trimethylpyrazolino.

4. A pyrazole azo dyestuff of claim 1, in which in formula (I),

R$^1$ denotes hydrogen, acetyl, propionyl, methanesulphonyl, ethanesulphonyl, methoxycarbonyl, ethoxycarbonyl or methylaminocarbonyl, R$^2$ denotes methyl, ethyl, propyl, butyl, cyanoethyl, chloroethyl, hydroxyethyl, hydroxypropyl, methoxyethyl, ethoxyethyl, methoxycarbonylethyl, allyl, cyclohexyl, benzyl, phenethyl, phenyl, tolyl or chlorophenyl, R$^3$ denotes hydrogen, chlorine or methyl, R$^4$ denotes hydrogen, fluorine, chlorine, hydroxyl, amino, methyl, ethyl, trifluoromethyl, formylamino, acetylamino, trifluoroacetylamino, propionylamino, acetoxy, methanesulphonylamino, methoxycarbonylamino, ethoxycarbonylamino, methoxycarbonyl or ethoxycarbonyl and R$^5$ and R$^6$ independently of one another in each case denote methyl, ethyl, propyl, butyl, chloroethyl, hydroxyethyl, cyanoethyl, methoxyethyl, methoxycarbonylethyl, acetoxyethyl, propionyloxyethyl, methoxycarbonyloxyethyl, ethoxycarbonyloxyethyl, benzyl, phenyl, tolyl or chlorophenyl.

5. A pyrazole azo dyestuff of claim 1, in which in formula (I),

R$^1$ denotes hydrogen, formyl, acetyl, trifluoroacetyl, propionyl, methanesulphonyl, ethanesulphonyl, methoxycarbonyl or ethoxycarbonyl, R$^2$ denotes methyl, ethyl, propyl, cyanoethyl or benzyl, R$^3$ denotes hydrogen or methyl, R$^4$ denotes acetamino, propionylamino, methanesulphonylamino or methoxycarbonylamino and R$^5$ and R$^6$ independently of one another in each case denote methyl, ethyl, propyl, cyanoethyl, methoxyethyl, methoxycarbonylethyl or acetoxyethyl.

6. A process of dyeing fibers, threads, flocks, woven fabrics or knitted fabrics or printing woven fabrics or knitted fabrics of acetylcellulose, polyesters or polyamides by applying thereto a pyrazole azo dyestuff of claim 1.

* * * * *